(12) United States Patent
Schiene et al.

(10) Patent No.: US 7,974,057 B2
(45) Date of Patent: Jul. 5, 2011

(54) INRUSH CURRENT LIMITER DEVICE AND POWER FACTOR CONTROL (PFC) CIRCUIT HAVING AN IMPROVED INRUSH CURRENT LIMITER DEVICE

(75) Inventors: Wolfgang Schiene, Wurselen (DE); Georg Greuel, Roetgen (DE); Marc Maria Alex Bleukx, Mechelen (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 594 days.

(21) Appl. No.: 12/067,053

(22) PCT Filed: Sep. 11, 2006

(86) PCT No.: PCT/IB2006/053213
§ 371 (c)(1),
(2), (4) Date: Mar. 17, 2008

(87) PCT Pub. No.: WO2007/031935
PCT Pub. Date: Mar. 22, 2007

(65) Prior Publication Data
US 2008/0253154 A1 Oct. 16, 2008

(30) Foreign Application Priority Data
Sep. 15, 2005 (EP) .................................... 05108481

(51) Int. Cl.
*H02H 9/00* (2006.01)
*H02H 9/08* (2006.01)

(52) U.S. Cl. ......................................... 361/58; 361/93.9

(58) Field of Classification Search ..................... 361/58, 361/93.9
See application file for complete search history.

(56) References Cited

U.S. PATENT DOCUMENTS

| 5,420,780 A | 5/1995 | Bernstein et al. |
|---|---|---|
| 5,715,154 A | 2/1998 | Rault |
| 5,789,894 A * | 8/1998 | Neiger et al. ................. 318/781 |
| 5,834,924 A | 11/1998 | Konopka et al. |
| 5,930,130 A | 7/1999 | Katyl et al. |
| 6,275,395 B1 | 8/2001 | Inn et al. |
| 6,862,201 B2 | 3/2005 | Hodge, Jr. |
| 2002/0080630 A1 | 6/2002 | Hodge, Jr. |
| 2003/0063481 A1* | 4/2003 | Kojori ............................ 363/49 |
| 2006/0274468 A1* | 12/2006 | Phadke ....................... 361/93.1 |

FOREIGN PATENT DOCUMENTS
EP 0591915 A2 4/1994
* cited by examiner

*Primary Examiner* — Ronald W Leja

(57) ABSTRACT

The present invention relates to an inrush current limiter device (4) for limiting inrushing current to a connectable load (3) comprising: at least one switchable IGBT-based limiter unit (5) for selectively limiting the inrushing current, having at least one current limiting conductor element for a limited leading of current and at least an IGBT-based switch (Q2), whereby the IGBT-based switch (Q2) is used as well as a controlled current limiter and as a by-pass element, and at least one control device (7) for controlling the IGBT-based switch (Q2), whereby the control device (7) comprises at least one IGBT-based switch supply (6) and means for realizing (8) a smooth flank of an output signal at the selected conductor element.

11 Claims, 2 Drawing Sheets

INRUSH CURRENT LIMITER DEVICE AND POWER FACTOR CONTROL (PFC) CIRCUIT HAVING AN IMPROVED INRUSH CURRENT LIMITER DEVICE

BACKGROUND OF THE INVENTION

The present invention relates to an inrush current limiter device for limiting inrushing current to a connectable load comprising: at least one switchable IGBT (Insulated Gate Bipolar Transistor)-based limiter unit for selectively limiting the inrushing current, having at least one current limiting conductor element for limited leading of current, and at least an IGBT-based switch, whereby the IGBT(Insulated Gate Bipolar Transistor)-based switch (Q2) is used as well as a controlled current limiter and as a by-pass element, and at least one control device for controlling the IGBT-based switch, whereby the control device comprises at least one IGBT-based switch supply and means for realizing a smooth flank of an output signal at the selected conductor element.

The present invention further relates to a power factor control circuit connectable to and/or between a main fed and a load comprising: an AC/DC converter with a capacitive buffer unit, and an inrush current limiter device.

Such well known power factor control circuits and inrush current limiters are used in a wide application area, where a load operating at high level of power and/or voltage has to be protected from damages by inrushing current. Modern loads are optimized for maximum electrical efficiency by minimizing consumption of electrical power. Unfortunately, the changes made to improve the efficiency of the ballast reduce certain external electrical resistances. This gives rise to a new problem: the occurrence of a large inrush off-current upon the first application of electrical power. This inrush current flows as a main filter capacitor and the ballast charges to its steady state value. For lighting circuit that contains a multiplicity of ballasts, the combined magnitude of the inrush is potentially large enough to cause contact failure of the switching device due to arching and contact welding.

To protect the load from damage by inrushing current, special power factor control circuits having inrush current limiters, are used.

Well known power factor control circuits for loads usually comprise an AC/DC converter followed by an inrush current limiter comprising an IGBT based switch supplied by an IGBT gate supply. For controlling the IGBT-switch, especially for switching, complex integrated circuits are used. Classically, the inrush current at switch-on is limited by either a NTC (Negative Temperature Coefficient) resistor, or a power resistor, which is short circuited by a relay or an IGBT after switch-on. While a NTC is only usable for lower power levels around a few hundred Watts due to its power losses, a relay has a low loss but a lifetime that is limited. The use of IGBT-based switches is a good solution with low losses for use at several thousand Watts and a long lifetime, but the timing and speed of switching it from off-state to a on-state is very critical. If this happens too soon or too abruptly, the IGBT- switch will break down due to excess current and power dissipation at the moment of switch-on.

Some very complex circuits and driver have been worked out to handle this switching, with still possible failure at repeated switch-on and -off. Another drawback is, that the circuits for controlling the IGBT are very complex and susceptible to damages.

Furthermore, the power factor control circuit known by the prior art works abruptly and produces drop-outs during the start period of the load due to a lack of synchronization between the load and an upstream arranged buffer.

SUMMARY OF THE INVENTION

Therefore, it is an object of the present invention to provide a power factor control circuit having an IGBT-based switch suitable for realizing smooth slopes of current signals at the IGBT-based switch. Moreover, it is a further object to provide a power factor control circuit that synchronizes the start period between the load and a buffer, whereby the device for controlling the IGBT-based switch has a less complicated and complex design.

This issue is addressed by an inrush current limiter device for limiting inrushing current to a connectable load comprising: at least one switchable IGBT-based limiter unit for selectively limiting the inrushing current, having at least one current limiting conductor element for a limited leading of current and at least an IGBT-based switch whereby the IGBT-based switch is used as well as a controlled current limiter and as a by-pass element, and at least one control device for controlling the IGBT-based switch, whereby the control device comprises at least one IGBT-based switch supply and means for realizing smooth flanks of an output signal at the selected conductor element.

Preferably, the means for realizing solely comprise elements selected from the group comprising resistors, capacitors, diodes, and/or passive components etc. This realizes a simple design, which is easy to produce. Thus no active IC-components must be used. The term "solely" does not exclude cabling or other connecting means.

The means for realizing can also comprise elements selected from the group of integrated passive circuits or networks alone or in combination with the aforementioned non IC elements.

The elements and/or units could be arranged at least partly in an integrated way into a housing. The housing can accommodate further units like heat sinks and the like.

More preferably is, that the means for realizing are arranged as a filter unit, selected from the group comprising low-pass filter units, coupled to the IGBT-based switch. By this filter the interfering signals are stopped from reaching the IGBT-based switch. Thereby sharp and abrupt flanks are prevented at the output of the conductor elements. The low pass filters are preferably non-IC-low pass filters without active IC-elements.

Also preferred is, that the elements of a filter unit are coupled like a star. From the center there is one line leading to the input of IGBT-based switch. Another line is directed via a diode, preferably a zener diode to the output of the IGBT-based switch. A third line is coupled to the input of an IGBT gate supply via a dV/dt limit resistor. A fourth line couples a dV/dt limit capacitor to the star like arrangement. The whole arrangement represents a low pass filter.

It is preferably, that the inrush current limiter device further comprises a chargeable capacitive buffer, arranged downstream in regard to the IGBT-based limiter unit for forming a buffered output. This capacitive buffer charges until it is completely charged. After fully charging, the current flows to the load and the IGBT-based switch is switched, such that the current passes the non-limited bypass conductor element part of the IGBT-based switch.

Preferred is also that the control device further comprises means for synchronizing the switching in regard to connectable load and/or the capacitive buffer. By providing a low pass filter smooth flanks are realized. For preventing drop out effects, the switching must be controlled in regard to the filling and the load. If the switch is activated such that the current to the load flows via the limited conductor element and the capacitive buffer is not completely filled, the load will completely use the energy stored in the buffer due to the fact, that the conductor elements do not supply the load with sufficient energy. So when the buffer is empty and the limited current conductor element does not provide enough power to the load, the load will have drop outs. To prevent the dropout effects means for synchronizing are provided. That means the IGBT-based switch unit switches from one position to the other depending from the filling status of the buffer and the operation mode of the load.

Preferred is, that the means for synchronizing comprise at least one switch and load activation circuit detecting the filling, status or charging of the chargeable capacitive buffer and/or sending a corresponding signal for switching the IGBT-based switch so that the by-pass conductor element part of the IGBT-based switch is the current leading conductor.

By this switch and load activation circuit it could be guaranteed that no drop out effects are likely to happen. Only after a fully charged buffer the load can be operated and the switch will be switched in the position, such that a sufficient supply of the load is realized.

Further, the issue is addressed by a power factor control circuit connectable to and/or between a main fed and a load comprising: An AC/DC converter with a capacitive DC buffer unit and an inrush current limiter device comprising a PFC voltage regulation unit arranged upstream to and having a regulation conductor meeting the inrush current limiter. The capacitive DC buffer serves as a high frequency decoupling unit and is formed by a corresponding capacitor.

Preferably, the output of the AC/DC converter is coupled to the inrush current limiter device by conductors, whereby one conductor meets the regulation conductor for decoupling and storing current in the DC buffer unit.

The IGBT-based switch supply, the means for realizing smooth flanks and/or the means for synchronizing can be at least partly integrated arranged. Even a combination with the IGBT-based limiter unit is possible. By this integrated arrangement the resulting integrated circuit would be suitable for smaller power ratings as well as for mass production in form of an integrated circuit.

All elements could be arranged discrete or at least partly in an integrated circuit manner.

These and other aspects of the invention will be apparent from and elucidated with reference to the embodiments described hereinafter.

DETAILED DESCRIPTION OF THE INVENTION

Figure 1:
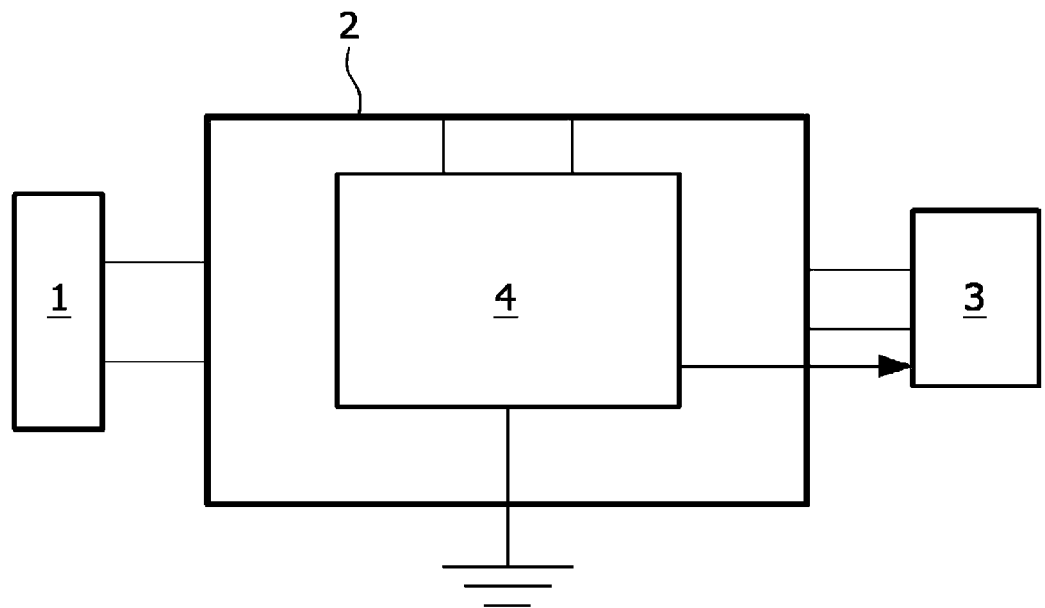
FIG. 1 shows systematically an arrangement of mains fed, power factor circuit control with inrushing limiter device and a load.

FIG. 1 shows schematically the design of the invention, whereby a mains fed 1 or a common ac source is connected to a PFC circuit 2 via leads. The PFC circuit 2 is connected to a load 3, whereby the load can be any load for example a lamp. The PFC-circuit further comprises an inrush current limiter device 4 which is at one end connected to ground and gets information from the load 3, represented by the arrow leaving the inrush current limiter device 4 in direction to the load 3. The inrush current limiter 4 is described in greater detail in FIG. 2.

Figure 2:
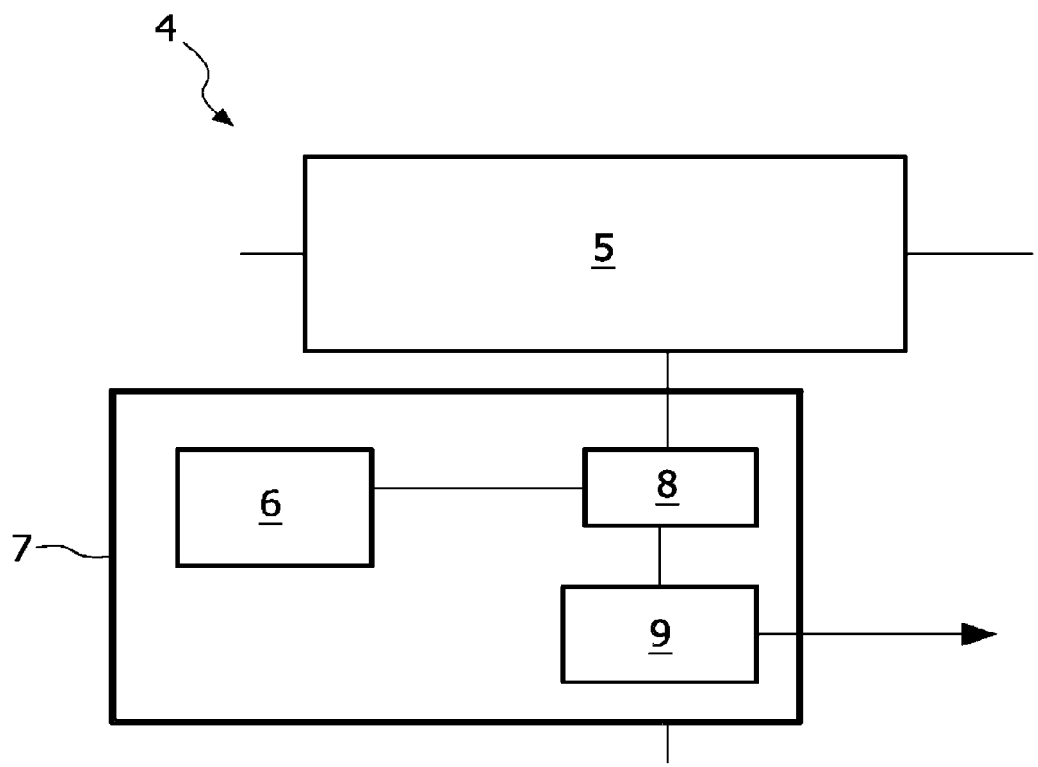
FIG. 2 shows systematically a more detailed view of the inrush current limiter device and, FIG. 3 shows a detailed view of an electronic layout.

FIG. 2 schematically shows the inventive inrush current limiter device 4. The inrush current limiter device 4 comprises an IGBT-based limiter unit 5 having a non limited and a limited conduction path (not shown in detail) which are alternatively coupled by a corresponding switch. The IGBT-based limited unit is supplied by an IGBT gate supply 6. The IGBT-based switch 5 is coupled to a control device 7 for controlling said IGBT-based switch 5 comprising means for realizing 8 a smooth flank of an output signal at the selected conductor element or conducting path and means for synchronizing 9 the switching in regard to a connectable load and/or capacitive buffer as well as the IGBT gate supply 6. The control device 7 is coupled to a load and/or a capacitive buffer (both not shown). A more detailed design of the invention is shown in FIG. 3.

Figure 3:
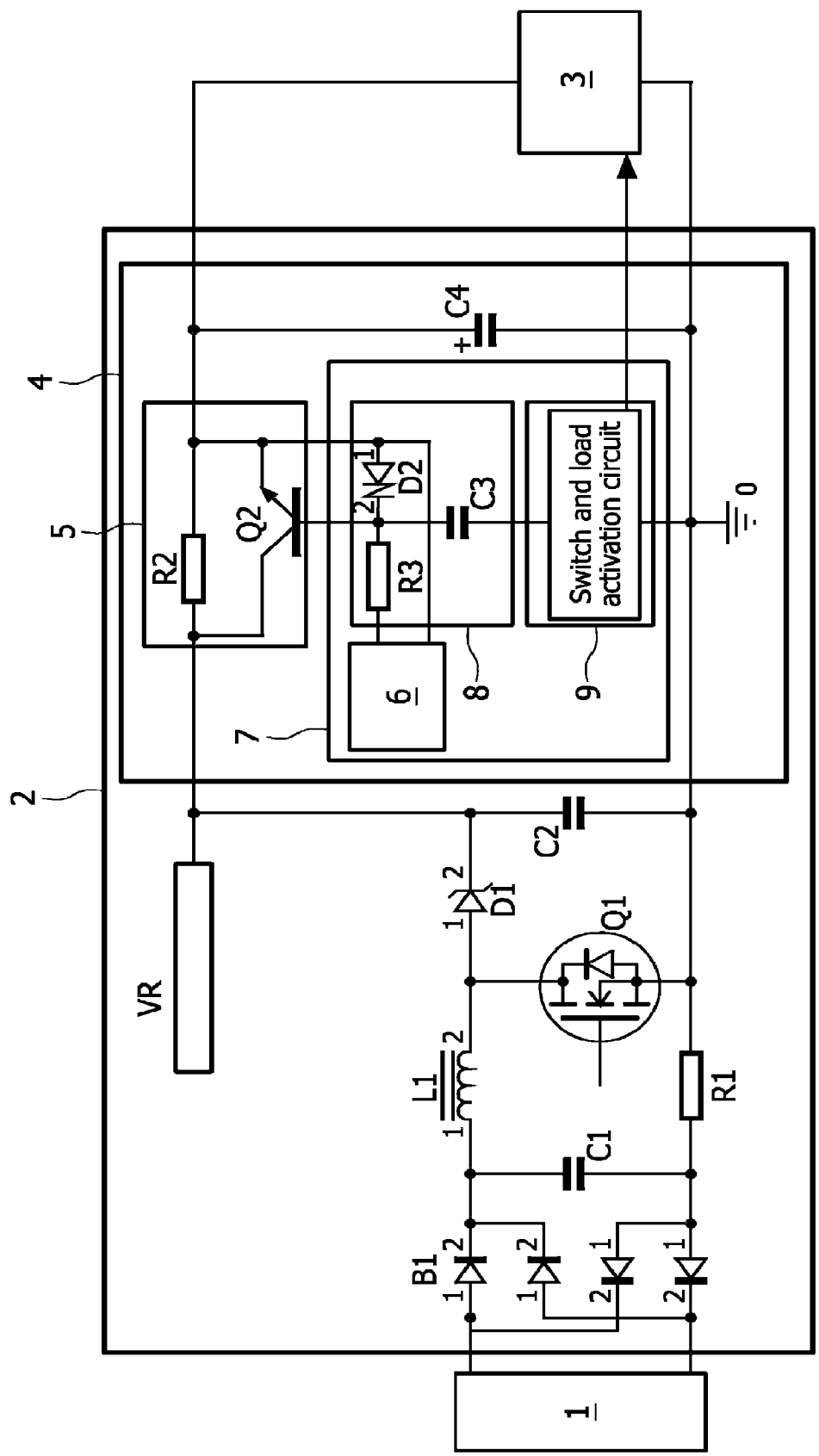

In FIG. 3 the diagram of a circuit is shown in detail. A PFC circuit 2 is coupled to a common AC source or main fed 1. The PFC circuit 2 comprises a classic part with a AC/DC transformer including (starting from left to right beginning at the main fed 1) a rectifier bridge B1, a PFC input capacitor C1, a PFC inductor L1, a PFC sense resistor R1, a PFC MOSFET Q1, and a PFC diode D1. parallel to that classic part a high frequency decoupling capacitor C2 is coupled leading to a summation point in which the signals of the decoupling capacitor C2 and the signal of a PFC voltage regulation unit VR are summarized. From that summation point the new part of the PFC circuit, the current inrush limiter device framed in at 4 starts. The current inrush limiter device 4 comprises the IGBT-based limiter unit 5 comprising one resistance limited conducting path or current limiting conductor element having an inrush current limit resistor R2, and one non limited conducting path or current non-limiting by-pass conductor element part. The conducting path branches from the limited conducting path via the pure IGBT-switch back to the limited conducting path.

Further the current inrush limiter device 4 comprises a control device 7 including one IGBT-based switch supply 6 and means 8, 9 for either realizing a smooth flank of an output signal at the selected conductor element or for synchronizing the switching in regard to a connectable load and/or a capacitive buffer C4. The IGBT-based switch supply 6 is formed as a common IGBT gate supply. The means for realizing 8 are formed as a low pass filter having a dV/dt limit resistor R3, a zener diode D2, preferably a 18 V zener diode, and/or a dV/dt limit capacitor C3. The low pass filter is connected to the IGBT-based switch limiter unit 5, more precisely to the input of the IGBT-based switch Q2, to the IGBT gate supply 6, and to the means for synchronizing 9. The means 9 are formed as a switch and load activations circuit comprising means for communication with the load. The means 9 is connected to the low pass filter and the lead connecting the AC/DC transformer and the load.

Here below the principle function of the driver is described.

The left part of the diagram (until main fed 1) gives the classical PFC circuit, in which the main fed 1 has been added serving as a high frequency decoupling a storage capacitor. The PFC DC output voltage regulation VR has been connected to capacitor C2 instead of to the output bulk capacitor C4 as is done normally.

R2 is a power resistor limiting the inrush current when the mains fed 1 is connected to a discharged capacitor C4. Ones the PFC starts running the IGBT (Q2) gate supply becomes active. Classically this gate supply is directly coupled to the IGBT, so that dangerous and possible destructive peak currents anticipation exist in the IGBT.

Here the gate supply is connected via resistor R3 and capacitor C3 is connected between the IGBT-gate and ground (via an electronic switch). R3 limits the charging current of capacitor C3, so that a limited dV/dt exists on capacitor C3 and by consequence also on capacitor C4 which is connected to the IGBT-emitter. Hence, the charging current of capacitor C4 (running through resistor R2 and IGBT Q2) is also limited so that no components can break down. Diode D2 serves as a gate protection diode. The current into capacitor C4 is determined by I=dV/dt×C4, where dV/dt is for example (10 volt/R3/C3). At the bottom of capacitor C3 a switch and dV/dt detection circuit is connected which switches the load on exactly at the time capacitor C4 is fully charged so that the PFC circuit will not switch on and off repeatedly because it sees not load for long time. The same time capacitor C3 is disconnected from the ground so that the load voltage ripple on capacitor C4 does not influence the gate voltage of IGBT Q2.

It is possible, to form an integrated circuit by the IGBT-based switch supply 6, the means for realizing 8, the means for synchronizing 9 and/or the IGBT based limiter unit, which would be suitable for mass production and could be used even with lower power ratings.

It should be considered, that the term "comprising" does not exclude other elements. As well "a" or "an" does not exclude a plurality and single units may fulfill the functions of several means recited in the claims. The reference signs given in the claims shall not be construed as limiting the scope of the claims.

LIST OF REFERENCE NUMBERS

1 mains fed
2 Power factor control (PFC) circuit
3 Load
4 Inrush current limiter device
5 IGBT based limiter unit
6 IGBT-based switch supply
7 Control device
8 Means for realizing (smooth flank)
9 Means for synchronizing (drop out free)
B1 Rectifier bridge
C1 Input capacitor
C2 Decoupling capacitor
C3 Limit capacitor
C4 Output capacitor
D1 PFC diode
D2 Zener diode
L1 inductor
R1 Sense resistor
R2 Limit resistor
R3 DV/dt limit resistor
Q1 MOSFET
Q2 IGBT-based switch
VR PFC voltage regulation unit

The invention claimed is:

1. A device, comprising:
a current limiter configured to selectively limit an inrushing current for a connected load, the current limiter comprising:
a current limiting conductor, and
an Insulated Gate Bipolar Transistor (IGBT) switch provided in parallel with the current limiting conductor; and
a controller configured to control a switching operation of the IGBT switch, the controller comprising:
a switch supply configured to provide a switch control signal to selectively turn on the IGBT switch, wherein the switch supply begins to provide the switch control signal after a delay period when an external power is first supplied to the device, and
a low pass filter arranged between the switch supply and a gate terminal of the IGBT switch, the LPF being configured to low pass filter the switch control signal and to supply the low pass filtered switch control signal as a gate signal to the gate of the IGBT switch.

2. The device of claim 1, wherein the LPF solely comprises elements selected from the group comprising resistors, capacitors, diodes and passive components.

3. The device of claim 1, further comprising a capacitive buffer connected to an output of the current limiter.

4. The device of claim 3, further comprising synchronizing means for synchronizing the switching operation to a charging state of the capacitive buffer.

5. The device of claim 4, wherein the synchronizing means comprises:
at least one switch and load activation circuit configured to detect the charging state of the chargeable capacitive buffer and in response thereto to output a LPF control signal for disabling the low pass filtering of the switch control signal.

6. The device of claim 3, further comprising a switch and load activation control circuit configured to connect the load to an output of the current limiter at a time when the capacitive buffer becomes fully charged.

7. The device of claim 6, wherein the LPF comprises:
a filter resistor directly connected between the switch supply and the gate of the IGBT switch; and
a filter capacitor directly connected between the gate of the IGBT switch and the switch and load activation control circuit.

8. The device of claim 7, wherein the switch and load activation control circuit is configured to connect the filter capacitor to ground while the capacitive buffer is not fully charged, and to disconnect the filter capacitor from ground at the time when the capacitive buffer becomes fully charged.

9. The device of claim 7, further comprising a diode directly connected between the filter resistor and an output terminal of the IGBT switch.

10. The device of claim 1, further comprising an AC/DC converter configured to receive the external power and to output a capacitively-buffered voltage to the current limiter.

11. The device of claim 10, wherein the AC/DC converter comprises:
a rectifier configured to receive the external power;
a decoupling capacitor configured to output the capacitively-buffered voltage to the current limiter; and
power factor correction circuitry connected between the rectifier and the decoupling capacitor.

* * * * *